United States Patent [19]
Gallagher et al.

[11] Patent Number: 5,495,872
[45] Date of Patent: Mar. 5, 1996

[54] FLOW CONDITIONER FOR MORE ACCURATE MEASUREMENT OF FLUID FLOW

[75] Inventors: James E. Gallagher, Kingwood; Ronald E. Beaty, Katy; Paul J. Lanasa, Houston, all of Tex.

[73] Assignee: Integrity Measurement Partners, Kingwood, Tex.

[21] Appl. No.: 189,100

[22] Filed: Jan. 31, 1994

[51] Int. Cl.⁶ .................................................... F15D 1/02
[52] U.S. Cl. ............................................. 138/44; 138/40
[58] Field of Search ............................. 138/44, 40, 39, 138/37, 41; 73/861.52; 428/131, 596

[56] References Cited

U.S. PATENT DOCUMENTS

| | | | |
|---|---|---|---|
| 1,473,349 | 11/1923 | Kach . | |
| 2,391,110 | 7/1944 | Walker . | |
| 2,600,733 | 6/1952 | Clift . | |
| 2,688,985 | 9/1954 | Holdenried | 138/44 X |
| 2,927,462 | 3/1960 | Li . | |
| 2,929,248 | 3/1960 | Sprenkle | 73/198 |
| 3,020,592 | 2/1962 | MacCaferri . | |
| 3,105,570 | 10/1963 | Bezemes | 181/56 |
| 3,191,630 | 6/1965 | Demyan | 138/42 |
| 3,250,469 | 5/1966 | Colston | 73/861.52 |
| 3,545,492 | 12/1970 | Scheld, Jr. | 138/44 X |
| 3,572,391 | 3/1971 | Hirsch | 138/40 |
| 3,645,298 | 2/1972 | Roberts et al. | 138/40 |
| 3,778,083 | 12/1973 | Hamasaki | 280/150 |
| 3,798,345 | 3/1974 | Priaroggia et al. | 138/44 X |
| 3,838,598 | 10/1974 | Tompkins | 73/861.52 |
| 3,840,051 | 10/1974 | Akashi et al. | 138/37 |
| 4,130,173 | 12/1978 | Cooksey | 181/212 |
| 4,142,413 | 3/1979 | Bellinga | 73/198 |
| 5,255,716 | 10/1993 | Wilcox | 138/44 |
| 5,341,848 | 8/1994 | Laws | 138/44 |

FOREIGN PATENT DOCUMENTS

| | | |
|---|---|---|
| 15354 | 11/1884 | France . |
| 0034079 | 1/1981 | France . |
| 224528 | 8/1922 | Germany . |
| 1473034 | 11/1968 | Germany . |
| 57-54705 | 1/1982 | Japan . |
| 57-190106 | 11/1982 | Japan . |
| 55970 | 12/1935 | Norway . |
| 11648 | 12/1899 | Sweden . |
| 20606 | 12/1899 | Switzerland . |
| 901680 | 1/1979 | U.S.S.R. . |
| WO91/01452 | 2/1991 | WIPO . |

*Primary Examiner*—David Scherbel
*Assistant Examiner*—Patrick F. Brinson
*Attorney, Agent, or Firm*—Pravel, Hewitt, Kimball & Krieger

[57] ABSTRACT

A flow conditioner for use in pipelines to isolate a measuring device from the effects of piping induced disturbances thereby allowing more accurate metering of fluids flowing in pipelines. The device comprises three sections: an anti-swirl device; a settling chamber; and a profile device. The three sections are installed in a pipeline at a predetermined distance upstream from a metering device and at a minimum predetermined distance downstream from a pipeline disturbance. In the pipeline, the anti-swirl device is the furthest upstream, followed by a settling chamber of a specified length, which in turn is followed by the profile device. The anti-swirl device substantially eliminates swirl, the settling chamber minimizes interaction between the anti-swirl device and profile device. The profile plate produces pseudofully developed turbulent structure and velocity profile so there is a minimum deviation of the empirical discharge coefficient or meter calibration factor for both short and long piping lengths. In certain circumstances, the unique profile plates provided may be used without anti-swirl devices.

15 Claims, 9 Drawing Sheets

FIG.1A
(PRIOR ART)
FIG.1B
(PRIOR ART)
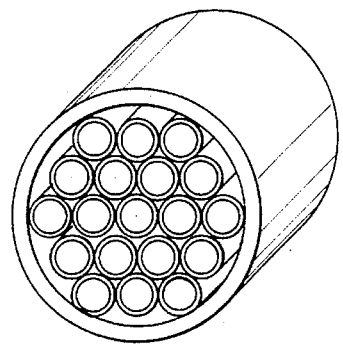
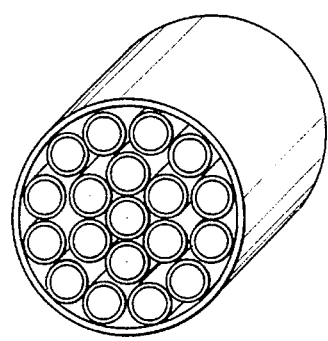
FIG.2
(PRIOR ART)
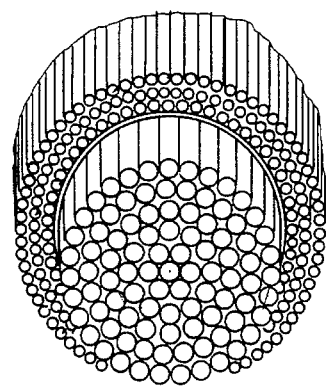
FIG.3
(PRIOR ART)
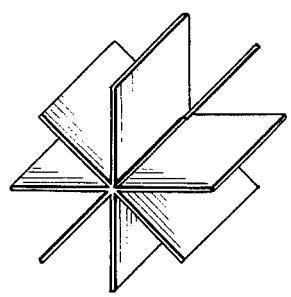
FIG.4
(PRIOR ART)
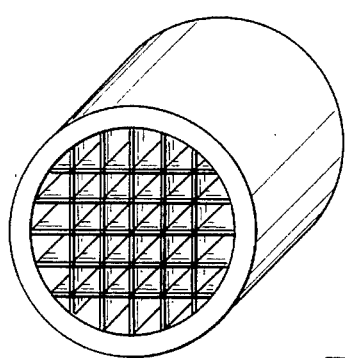
FIG.5
(PRIOR ART)
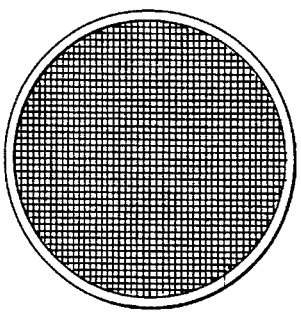

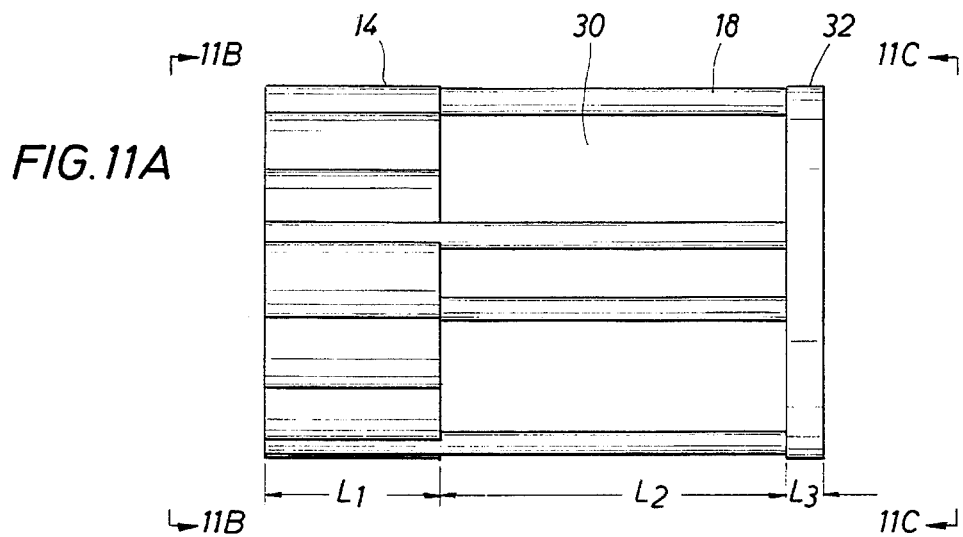
FIG.11A
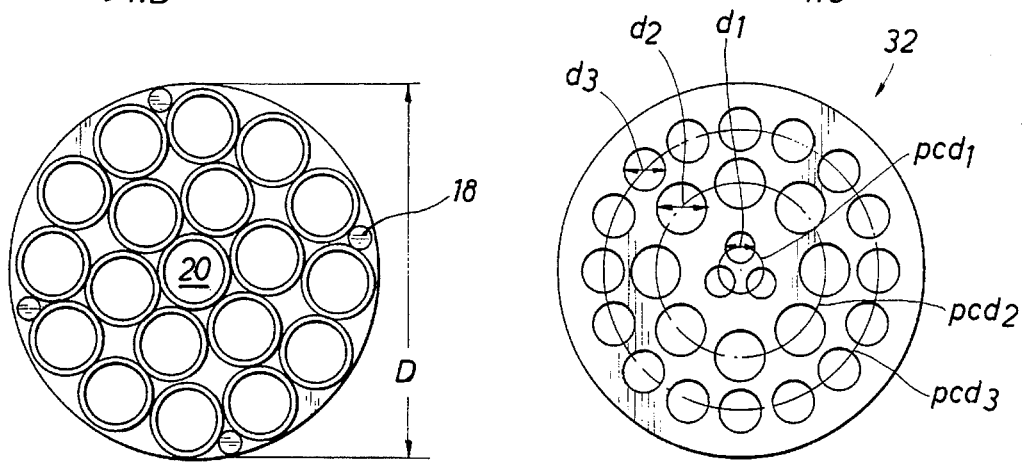
FIG.11B
FIG.11C
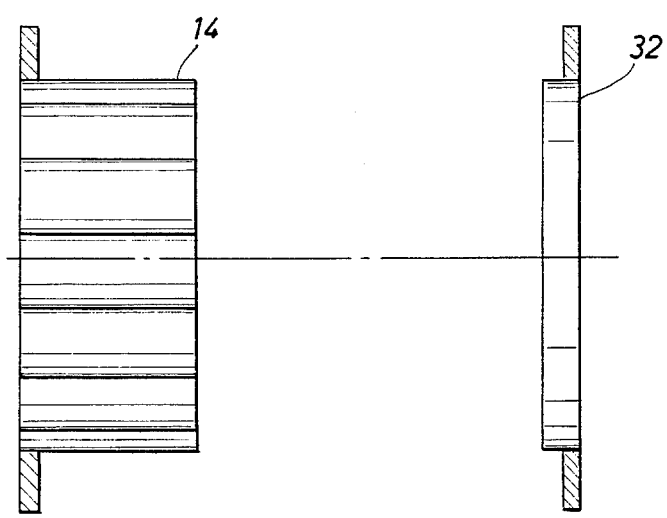
FIG.12

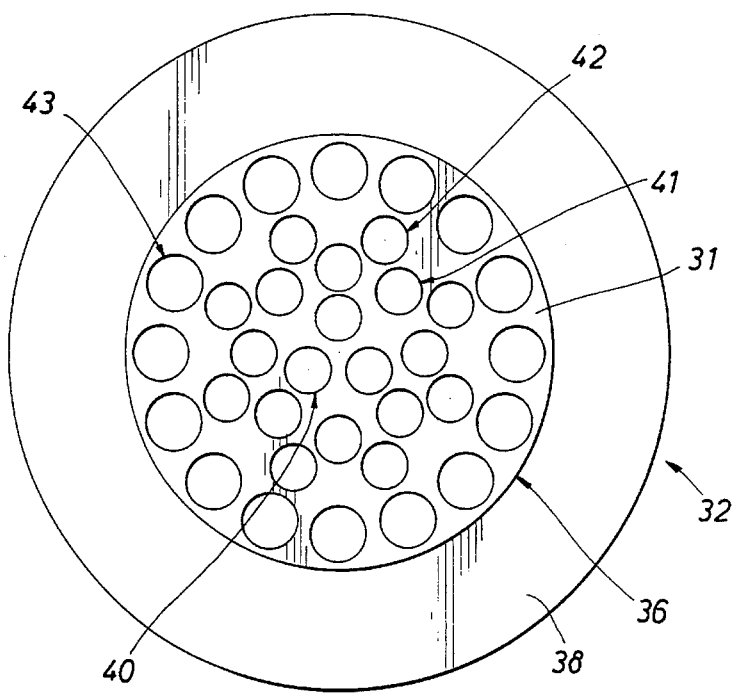
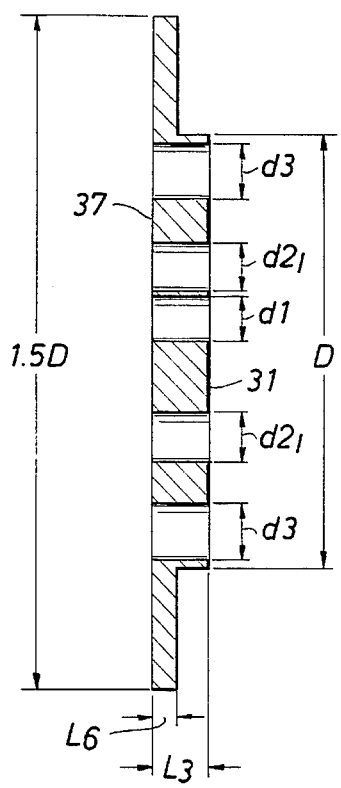
FIG.15A
FIG.15B
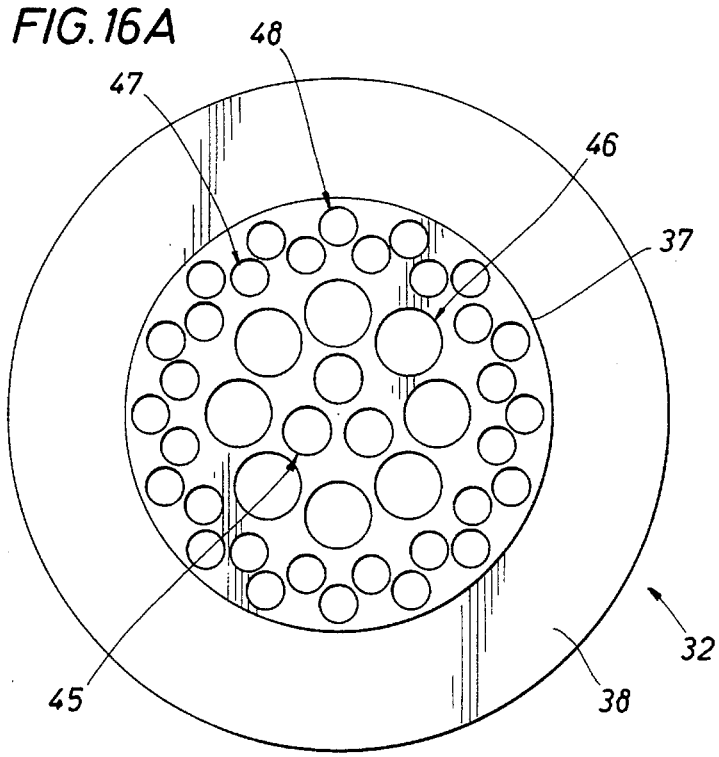
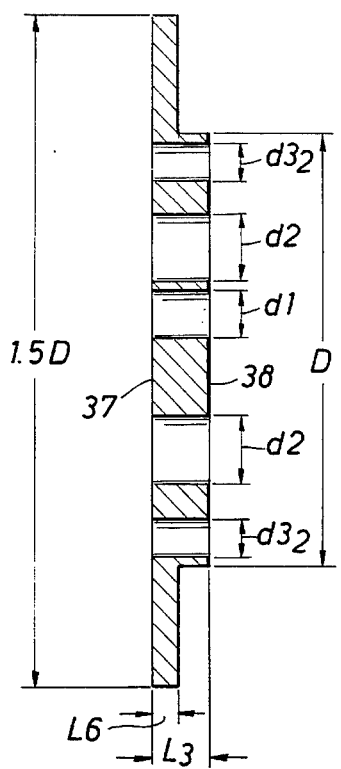
FIG.16A
FIG.16B

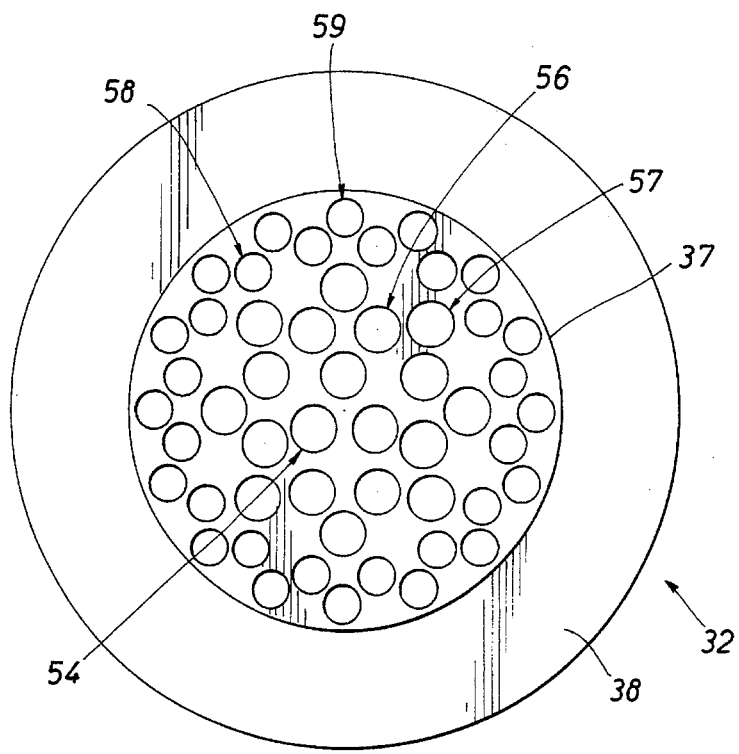
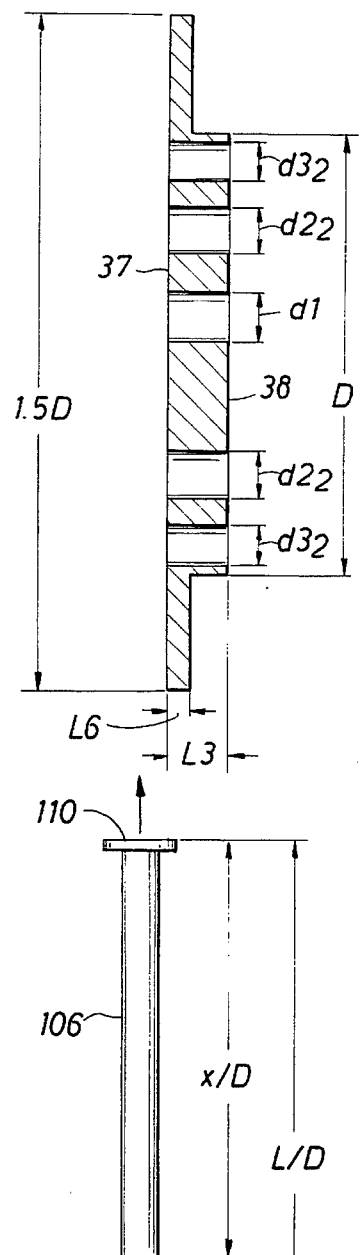
FIG.17B  FIG.17A
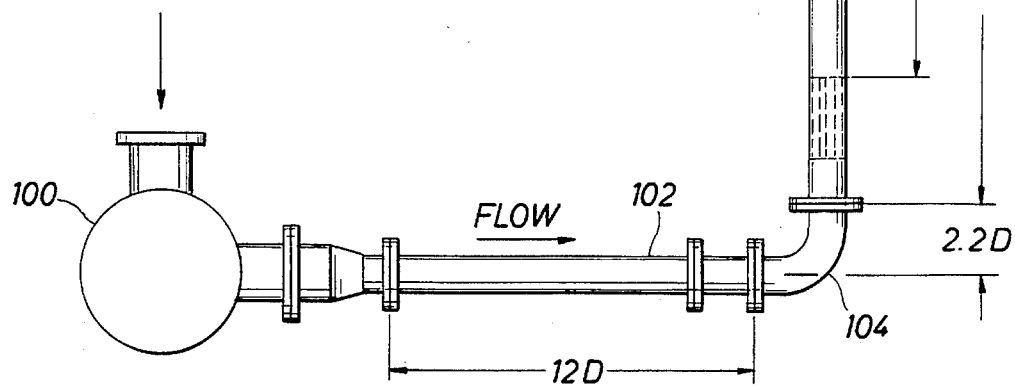
FIG.18

FLOW CONDITIONER FOR MORE ACCURATE MEASUREMENT OF FLUID FLOW

BACKGROUND OF THE INVENTION

1. Field of the Invention

The invention relates to an improved flow conditioner used in tubular conduits carrying single phase fluids. In particular, the invention minimizes metering errors by producing fully developed velocity profile, fully developed turbulence structure, and substantially eliminating swirl of fluids flowing in a conduit.

2. Description of the Related Art

The North American natural gas industry produces, transports and distributes approximately 700 billion cubic meters of gas each year (25 trillion standard cubic feet). The Western European market transports and distributes 250 billion cubic meters of gas each year (9 trillion standard cubic feet). Because of the importance of gas measurement for industry operations and fiscal accountability, it is essential that metering be accurate, reliable, and cost efficient over a range of conditions.

All of this gas is measured at least once, and most of it several times, in meter sizes ranging from 25–900 mm (1–36 inches), at pressures from below atmospheric to 14 MPa (2,000 psi), at temperatures from 0°–100° C. (32°–212° F.), with several types of meters. Large volume metering stations utilize either concentric, square-edged, flange-tapped orifice meters or gas turbine meters.

For over sixty years, the concentric orifice meter has remained the predominant meter of choice for natural gas production, large volume gas flow and chemical metering applications. In fact, it is currently estimated that over 600,000 orifice meters are being used for fiscal measurement applications associated with the petroleum, chemical and gas industries in North America.

All flowmeters are subject to the effects of velocity profile, swirl and turbulence structure of the flowing fluid being measured. Meter calibration factors or empirical discharge coefficients are valid only if geometric and dynamic similarity exists between the metering and calibration conditions or between the metering and empirical data base conditions (i.e., fully developed flow conditions exist). In fluid mechanics, this is commonly referred to as the Law of Similarity.

The classical definition for fully developed turbulent flow is stated by Hinze as follows:

For the fully developed turbulent flow in the pipe the mean-flow conditions are independent of the axial coordinate, x and axisymmetric, assuming a uniform wall condition.

From a practical standpoint, fully developed flow implies the existence of a swirl-free, axisymmetric time average velocity profile in accordance with the Power Law or Law of the Wall prediction. However, fully developed turbulent flow requires equilibrium of forces to maintain the random "cyclic" motions of turbulent flow. This in turn requires that the velocity profile, turbulence intensity, turbulent shear stress, Reynolds stresses, etc., are constant with respect to the axial position.

Unfortunately, fully developed pipe flow is only achievable after considerable effort in a research laboratory. To bridge the gap between research and industrial applications, reference is made to the term pseudo-fully developed flow defined as:

a swirl-free, axisymmetric flow with time average velocity profile and turbulence structure having values approximating those found in fully developed flow and independent of the axial coordinate.

Stated another way, Pseudo-fully developed flow exists when the slope of the orifice meter's discharge coefficient deviation asymptotically approaches zero as the axial distance from the orifice meter to the upstream flow conditioner increases. Of course, this assumes that the empirical discharge coefficient baseline was conducted under fully developed flow conditions.

In the industrial environment, multiple piping configurations are often assembled in series generating complex problems for organizations that write standards and flow metering engineers. The challenge is to minimize the difference between actual or "real" flow conditions in a pipeline and the vertical or research-achievable "fully developed" flow conditions, on a selected metering device's performance to minimize error. One of the standard error minimization methods is to install a flow conditioner in combination with upstream straight lengths of pipe to "isolate" the meter from upstream piping disturbances. Present domestic and international measurement standards provide specifications for upstream straight pipe lengths and flow conditioners upstream of orifice meters. See, e.g., American National Standard Institute (ANSI) (ANSI 2530) and International Standards Organization (ISO) (ISO 5167). Unfortunately, there is considerable disagreement over straight length requirements between ANSI and ISO.

With respect to installation effects and the near term flow field, the correlating parameters which affect similarity vary with meter type and design. However, it is generally accepted that a concentric, square-edged, flange-tapped orifice meter exhibits a high sensitivity to time average velocity profile, turbulence structure, bulk swirl and tap location.

In North America, current design practices utilize short upstream piping lengths with a specific flow conditioner, American Gas Association (A.G.A.) tube bundles, to provide "pseudo-fully developed" flow in accordance with the applicable measurement standard (ANSI 2530/A.G.A. Report No. 3/API (American Petroleum Institute) MPMS Chapter 14.3). Most North American installations consist of 90 degree elbows or complex header configurations upstream of the orifice meter. Tube bundles in combination with piping lengths of seventeen pipe diameters (17,D) have been installed in an effort to eliminate both swirl and distorted velocity profiles. Ten diameters (10*D) of straight pipe is required between the upstream piping fitting and the exit of the tube bundle, and seven diameters (7,D) of straight pipe is required between the exit of the tube bundle and the orifice meter.

In Western Europe, two design practices are currently employed to provide "pseudo-fully developed" flow in accordance with the applicable measurement standard (ISO 5167)— long upstream piping lengths with or without flow conditioners. Most Western European installations consist of complex header configurations upstream of the orifice meter. Piping lengths of one hundred pipe diameters (100*D) without flow conditioners or piping lengths of forty-two pipe diameters (42*D) in combination with flow conditioners have been installed in an effort to eliminate both swirl and distorted velocity profiles.

Three types of flow conditioners have been generally utilized in Western Europe—tube bundles, Zanker and Sprenkle designs. Twenty diameters (20*D) of straight pipe is required between the upstream piping fitting and the flow conditioner, and twenty-two diameters (22*D) of straight pipe is required between the flow conditioner and the orifice meter.

The optimal flow conditioner should achieve a range of design objectives including: a minimal deviation of empirical discharge coefficient (or meter calibration factor) for both long and short pipe lengths; low permanent pressure loss across the flow conditioner (i.e., low "head ratio"); a low fouling rate or a low sensitivity to accumulation of foulants; elimination of swirl; and flexibility for use in both short and long straight lengths of pipe. The latter objective can be achieved by a flow conditioner that produces an axisymmetric, pseudo-fully developed time average velocity profile and turbulence structure. Additionally, it is also desirable that the flow conditioner should be subject to rigorous mechanical design and have a moderate cost of construction.

In the specification and claims, when the swirl angle is less than 2° as conventionally measured by using pitot tube devices, swirl is regarded as substantially eliminated. Further, when the empirical discharge coefficient or meter calibration deviation for both short and long piping lengths is about 1/10 of 1% it is assumed to be at a "minimum".

The ISO and A.G.A. designs, shown in FIGS. 1A and 1B respectively, are intended to eliminate swirl. Both designs include a bundle of tubes having the same length and diameter. For the A.G.A. design (Figure 1B), the length of the bundle must be at least ten times the tube diameter. For meter runs larger than 75 mm (3 inches) the bundle typically consists of nineteen tubes arranged in a circular pattern with a bundle length of two to about three pipe diameters. For smaller meter runs, the bundle consists of seven tubes arranged in a circular pattern with a bundle length of three pipe diameters. For both the ISO and A.G.A. designs, permanent pressure loss is low, mechanical design is rigorous, cost of construction is low, fouling rate is low, and swirl is eliminated. However, the performance of these devices for minimal deviation from the empirical discharge coefficient for both short and long piping lengths is unacceptable. Also, velocity profile and turbulence structure measurements have shown that both A.G.A. and ISO designs cannot produce pseudo-fully developed flow conditions within reasonable distances due to their high porosity and constant radial resistance. This is shown by the instability in the coefficient performance graphs, FIGS. 19 and 21.

The Sens & Teule flow condition as shown in FIG. 2 is designed to isolate piping disturbances from flow meters. The design consists of a bundle of tubes of different lengths and diameters arranged in a circular array. Permanent pressure loss is high, cost of construction is high, and prototype designs are rigorous and complex. While swirl is eliminated, the fouling rate of this design is unknown. It has been reported that the device exhibits pseudo-fully developed time average velocity profile and turbulence structure for short piping lengths. Geometric scaling of the device is a problem, when considering a range of pipe sizes.

FIGS. 3 and 4, respectively, show the Etoile and Air Moving and Conditioning Association (AMCA) vane-type of swirl eliminator. The Etoile design consists of three flat plates of equal length and width assembled in a star-shaped pattern around a central hub. While these designs eliminate swirl, it is known that the Etoile design does not produce pseudo-fully developed flow conditions in reasonable distances. Similarly, the AMCA design (FIG. 4) was not intended to produce a pseudo-fully developed flow.

FIG. 5 shows an example of screens or wire gauze assembled in an egg-crate fashion within a pipeline. Fine mesh screens are impractical in an industrial environment due to high permanent pressure loss, non-rigorous mechanical construction, and high fouling rates.

Perforated plates, such as the Sprenkle design, shown in FIG. 6, were designed to isolate piping disturbances from flow meters for measuring steam flow. The design consists of three perforated plates spaced one diameter apart and connected by rods. Each plate has a porosity of about fifty percent with regularly distributed perforations in a specified hexagonal pattern. The size of the perforations is about five percent of the pipe diameter. While the designs eliminate swirl, cost of construction is high, design is rigorous and complex, permanent pressure loss is very high, and fouling rate is moderate. Further, performance for minimal coefficient deviation for short piping lengths is unacceptable. Finally, the design is thought to not produce pseudo-fully developed flow conditions for short piping lengths due to its almost constant radial resistance.

The Bellinga design, shown in FIG. 7, is a modified Sprenkle design that suffers much the same shortcomings as Sprenkle.

The Zanker design, shown in FIG. 8A, was designed to isolate piping disturbances for the purpose of pump efficiency testing. The device consists of a perforated plate connected to a downstream grid or egg crate construction. The plate includes 32 holes of five different diameters, each hole having a specified location. Permanent pressure loss for this device is high as is cost of construction. While the design eliminates swirl, the design does not provide minimum deviation from empirical discharge coefficient for both short and long piping lengths. Therefore, the design is thought to not produce pseudo-fully developed flow conditions for all piping configurations.

The Akashi design, sometimes referred to as the Mitsubishi design, as shown in FIG. 9, consists of a single perforated plate with 35 holes. The hole size is 13 percent of the pipe diameter and the perforated plate thickness is equal to the hole diameter. The plate has a porosity of approximately 59 percent. Hole distribution is dense toward the (center of the pipe) and sparse around the periphery (pipe wall). The upstream inlets of the holes are beveled. While the device produces a low permanent pressure loss and mechanical design is rigorous and simple, performance for minimal deviation from empirical discharge coefficient for both and short and long piping lengths are unacceptable since the design calls for almost constant radial resistance. The design is further thought to not produce pseudo-fully developed flow conditions for all piping configurations because it does not provide minimal deviation from the empirical discharge coefficient for both short and long pipe lengths.

The Laws device, shown in FIG. 10, is also a single perforated plate, but with 21 holes. The plate thickness is approximately 12 percent of the pipe diameter (D) and the plate has a porosity of about 51 percent. The holes are arranged in circular spaced arrays around a central hole. The first and second arrays have 7 and 13 holes respectively. Hole size is largest in the middle of the pipe, 0.1924*D, and decreases in size to the first circular array, 0.1693*D, and further in size to the second array, 0.1462*D. The pitch circle diameter for the first and second array are about 46 and 84 percent of the pipe diameter respectively. Upstream inlets of the holes may be beveled. Once again, the performance for minimal deviation from the empirical discharge coefficient for short piping lengths is unacceptable, but acceptable for long piping lengths. The design can produce axisymmetric, pseudo-fully developed conditions only for long piping lengths.

A further development of a device shown in U.S. Pat. No. 5,255,716 to Wilcox is the K-Labs Mark V. The patent shows a flow conditioner comprising tubular passages with the area between specific tubes blocked. While permanent pressure loss is low and mechanical design is rigorous and simple, and swirl is eliminated from most piping configurations, the performance for minimal deviation from the empirical discharge coefficient for short piping lengths is unacceptable. Therefore, the design is thought to not produce pseudo-fully developed flow conditions for all piping configurations.

What is yet required is a flow conditioner for use with flow meters to provide measurements that are sufficiently accurate for industrial and fiscal applications. The flow conditioner should achieve all the design criteria stated above including elimination of swirl, and achievement of a minimal deviation from the empirical discharge coefficient or meter calibration factor for both short and long straight lengths of pipes by the production of a pseudo-fully developed time average velocity profile and turbulence structure. Further, the device should have a low permanent pressure loss (head ratio) across the flow conditioner, low fouling rate or insensitivity to foulant accumulation. Finally, the device should be subject to a rigorous mechanical design and should have a relatively moderate cost of construction.

SUMMARY OF THE INVENTION

The flow conditioner according to the invention isolates flow meters from piping-induced disturbances and thereby allows more accurate metering of fluids flowing in pipelines. The invention achieves optimal flow conditioner objectives and maintains pseudo-fully developed flow in a pipeline with respect to the axial direction. Random cyclic forces generated by the conditioner produce a self-stabilizing mechanism for the velocity profile and turbulence structure within a short axial distance.

The invention device produces pseudo-fully developed flow conditions for both short and long piping lengths, as shown by the stability in the coefficient performance graphs. Further, and importantly, the deviation of the empirical discharge coefficient or meter calibration factor, for both short and long piping lengths, is at an acceptable minimum. The flow conditioner according to the invention exhibits a low permanent pressure loss and has a rigorous, simple mechanical design. Fouling rate is low and swirl is essentially eliminated. Manufacturing cost is moderate and retrofitting of existing installations is readily accomplished.

To achieve its objectives, the preferred device according to the invention comprises three sections: an anti-swirl device, a settling chamber, and a flow profile device; each mounted sequentially in a specific order and at specific distances from each other in the pipeline carrying the fluid to be measured. In certain instances, when the fluid flow pattern does not necessitate anti-swirl measures, then only the equivalent of a settling chamber and the profile device is needed, according to the invention.

In sharp contrast to the prior art, which has promoted the use of anti-swirl devices downstream of profile devices for more than 30 years, the present invention teaches the use of an anti-swirl device located upstream of the profile device.

The flow conditioner of the invention may be preassembled into a unit or module that is then installed into a pipeline at a predetermined distance upstream of a flow meter and beyond a predetermined distance downstream of the nearest source of flow disturbance (valve, elbow, complex pipe configuration) upstream of the flow meter. The flow conditioner is oriented in the pipeline such that the anti-swirl device is farther upstream, followed by a downstream settling chamber, and a further downstream profile device or plate.

The anti-swirl device according to the invention reduces swirl to less than 2° at its exit. Further, the anti-swirl device generates a slight distortion to allow the profile device to generate pseudo-fully developed flow conditions. According to the invention, a tube bundle anti-swirl device design is preferred. This design eliminates geometric similarity concerns and provides an opportunity for low manufacturing costs. Further, the design generates reproducible turbulence intensities and turbulence shear stresses, regardless of the upstream piping disturbance. Further, the design provides a constant radial resistance and low blockage factor. Finally, this design provides an assurance of swirl elimination.

Immediately downstream from the anti-swirl device is the settling chamber. This chamber is required to eliminate or minimize interaction between the anti-swirl device and profile device. Further, the chamber also allows uniformity of the turbulence structure to develop prior to inlet to the profile device. Essentially, the settling chamber is a section of constriction-free pipe between the anti-swirl device and the profile device of sufficient length to achieve these objections.

Downstream of the settling chamber is the profile device, which generates a pseudo-fully developed flow within five to ten nominal downstream pipe diameters. According to the invention, a radially-graded plate of specific design is regarded as the optimal profile device. This profile plate according to the invention combines radially graded resistance with an appropriate plate porosity to produce a pseudo-fully developed flow profile. Radially graded resistance is achieved by shaping the device through an uneven hole distribution as a function of its radial position. The placement of circular arrays, along with the size and number of holes in the respective arrays, are critical. The size of the holes contribute to turbulence intensity and mixing downstream of the plate. Further, the placement of the circular arrays contribute to the time average velocity profile and turbulent mixing downstream of the plate. As a result, interaction of porosity, hole location and hole diameter are critical.

Downstream of the profile device is the measuring device. The distance X between the profile device and the measuring device is critical. The invention provides for X as low as D or 3 D, depending upon the type of measuring device used. This short distance is important, especially in retrofitting short meter pipe lengths or in fitting new meter pipes in an area where space is restricted. Thus, the invention provides a significant advantage over the art in that the devices are both compact and provide superior flow conditioning so that the minimum deviation (0.1%) from the empirical coefficient of discharge or meter calibration factor is readily achieved.

BRIEF DESCRIPTION OF THE DRAWINGS

A better understanding of the present invention can be obtained when the following detailed description of the preferred embodiment is considered in conjunction with the following drawings, in which:

FIG. 1A is a schematic representation of the ISO design swirl eliminator;

FIG. 1B is a schematic representation of the A.G.A. design swirl eliminator;

FIG. 2 is a schematic of the Sens & Teule swirl eliminator design;

FIG. 3 is a schematic representation of the Etoile vane-type swirl eliminator;

FIG. 4 is a schematic representation of the AMCA vane-type swirl eliminator;

FIG. 5 is an example of a screen or wire gauze assembled in egg-crate design for use within a pipeline;

FIG. 11A is a side view of an embodiment of the flow conditioner according to the present invention;

FIG. 11B is an end view B showing the tubes making up the anti-swirl device of an embodiment of a flow condition according to the present invention;

FIG. 11C is an end view C showing the distribution of holes on a profile plate of a flow conditioner according to the present invention;

FIG. 12 is an embodiment of a flow conditioner according to the present invention showing an anti-swirl device equipped with flanges and a profile plate equipped with flanges for fitting into a pipeline;

FIGS. 15A and B show an embodiment of a profile plate according to the invention with four arrays of holes or perforations;

FIGS. 16A and B show an embodiment of a profile plate according to the invention with four arrays of holes or perforations;

FIGS. 17A and B show an embodiment of a profile plate according to the invention with five arrays of holes or perforations;

FIG. 18 shows a schematic of a test loop used to compare flow conditioners of the invention with other devices;

DETAILED DESCRIPTION OF THE PREFERRED EMBODIMENTS

Figure 6:
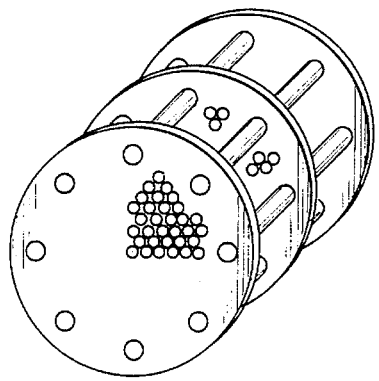
FIG. 6 is a schematic of the Sprenkle flow condition design showing three perforated plates spaced one diameter apart interconnected with rods.
Figure 7:
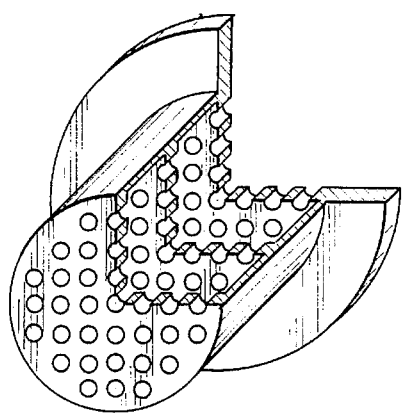
FIG. 7 is a schematic of the Bellinga design.
Figure 8A:
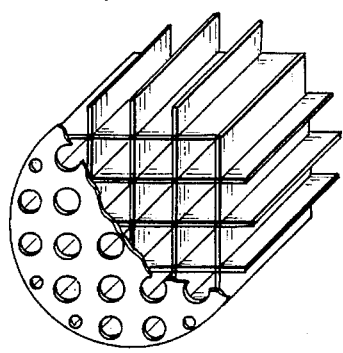
FIG. 8A is a schematic of the Zanker design showing a perforated plate connected to downstream grate or egg-crate construction.
Figure 8B:
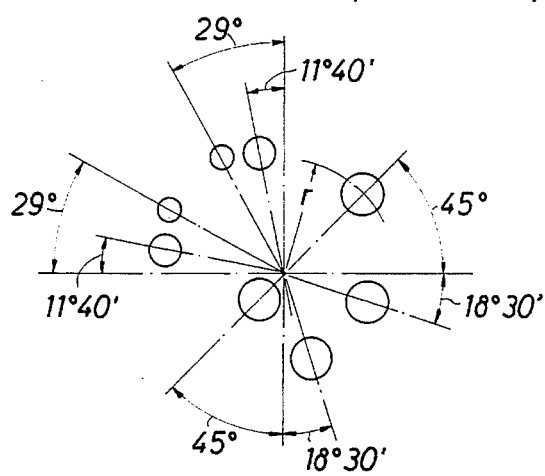
FIG. 8B shows the orientation and distribution of holes on the Zanker perforated plate.
Figure 9:
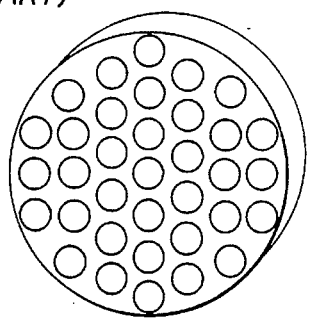
FIG. 9 is a schematic of the Akashi perforated plate design.
Figure 10:
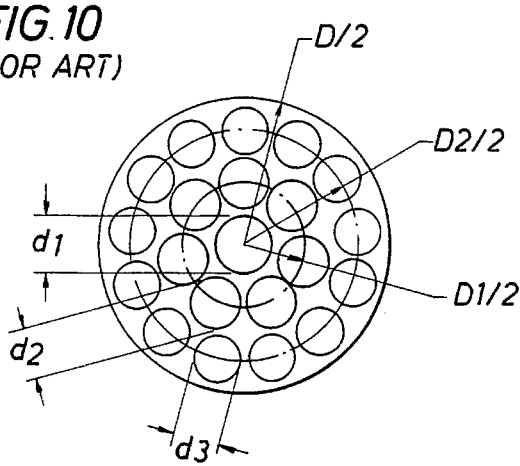
FIG. 10 is a schematic of the Laws perforated plate design.

The flow conditioner according to the present invention preferably comprises three parts: an anti-swirl device, a settling chamber, and a profile device, arranged in a specific order and at specific distances relative to each other to isolate piping-induced disturbances from a flow meter and thereby allow more accurate metering of fluids flowing in pipelines. More specifically, the flow conditioner of the invention eliminates swirl (reduces swirl to less than or equal to 2°) and provides pseudo-fully developed time averaged velocity profiles and turbulence structure so that any deviation from empirical discharge coefficient or meter calibration factor is less than ⅒ of 1%.

In certain circumstances, an anti-swirl device is not necessary because of the nature of the type of fluid flow (i.e., swirl-free or low swirl). In this event, according to the invention, only an equivalent to the settling chamber and the profile device is needed.

In order to more fully appreciate the present invention, reference is made to embodiments shown in FIGS. 11–12 and 15–17 which illustrate flow conditioners according to the invention but which do not limit the invention as disclosed herein and claimed below. For installation into a pipeline, anti-swirl device 14 may be coupled to profile device 32 by spacers 18, as detailed in FIG. 11A, to produce a unitary structure. Anti-swirl device 14, as shown in FIG. 11B, preferably comprises a bundle of nineteen tubes each having a tube diameter that is approximately ⅕ of the diameter of the pipe within which the flow conditioner is to be fitted (D). Preferably, the tubes are arranged as shown in FIG. 11B: a central tube 20 surrounded by two arrays of tubes of equal diameter. Preferably, all the tubes are of the same length $L_1$, ranging from about 0.2*D to about 1*D, most preferably, about 0.5*D, where D is the internal diameter of the pipe.

Whereas the above description is of the preferred anti-swirl device according to the invention, other anti-swirl devices may also be used. Thus, the anti-swirl device could be of a vane or honey comb design. The vane design presents certain limitations with respect to retrofitting existing installation. The honey comb design represents certain geometric limitations when considering variations in pipe diameter and honey comb size that may be encountered in practice. Thus, the preference for the tube bundle design shown in FIG. 11B, is not limiting of the type of anti-swirl devices that may be utilized according to the invention.

Downstream of the anti-swirl device 14 is a settling chamber 30. The length of the settling chamber $L_2$ can be adjusted by selection of the length of spacers 18. Alternatively, $L_2$ can be determined by otherwise affixing the anti-swirl device 14 and the profile device 32 in the pipeline, at a selected distance apart, without the use of spacers. The selection of settling chamber length is critical and must be sufficient to effectively decouple anti-swirl effects from the profile device 32 and thus length varies depending upon jetting velocity the fluid being measured. Based on test results, $L_2$ ranges from about 1*D to about 20*D, preferably 2*D to 5*D, and most preferably is about 3*D.

Figure 13:
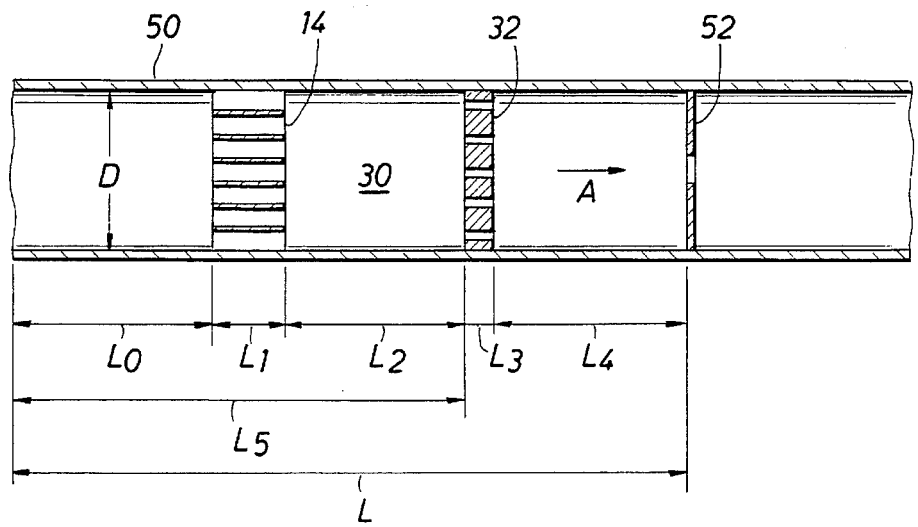
FIG. 13 is a schematic diagram, not to scale, showing the installation of an embodiment of the invention flow conditioner in a pipe line.

In FIG. 13, the profile device 32, according to the invention, is located at a distance $L_4$ from the measuring device 52 that is sufficient to decouple the measuring device 52 from effects of the profile device 32. This distance will vary depending upon several factors, including the type of measuring device. For instance, if the measuring device is a turbine meter, then the profile plate may be located as close to the meter as feasible or less than about 0.5 D from the inlet side or the upstream face of the turbine meter. On the other hand, if the measuring device is an orifice plate, then the downstream face of the profile device should preferably be located at a distance $L_4$ of equal to or greater than about 3*D from the orifice plate.

In general, in any meter run, the critical dimensions and distances according to the invention are the length of the settling chamber $L_2$ and the distance of the profile device from the measuring device $L_4$. For example, in a typical orifice plate meter run, using preferred dimensions, the entire length taken up by the flow conditioner of the invention may be:

$$L_1+L_2+L_3+L_4=0.5\,D+D+0.125\,D+D=6.6\,D$$

Thus, for a 4-inch inside diameter pipe, the distance is only 26.4 inches.

In the event that flow conditions in the pipeline indicate that an anti-swirl device is not necessary, then the "settling chamber" length $L_5$ extends from the nearest flow disturbance (elbow, tee, valve, etc.) located upstream from the flow meter to the profile device. In this instance, the "equivalent settling chamber" length is from about 1*D to about 20*D, and preferably about 2*D to about 5*D; most preferably at least about 3*D.

Downstream from the settling chamber 30, is the profile device 32. The profile device is a radially graded perforated plate of thickness $L_3$ where $L_3$ is preferably in the range about 0.10*D to 0.5*D, most preferably about 0.125*D.

Radially and axially graded plates have been considered as alternative profile devices, but the cost of testing these plates rigorously is prohibitive. Nevertheless, it is believed that they will operate as suitable profile devices in conjunction with the anti-swirl device and settling chamber. Radially graded tube bundles and radially and axially graded tube bundles were also considered and rejected for various reasons.

As shown in FIG. 11C, profile device 32 preferably has three radially spaced circular arrays of holes or through bores spaced around the center of the plate. Other designs are shown in FIGS. 14–17.

In the first or central array of through bores or holes in profile device 32, centered on the loci of the circle of diameter pcd, there are preferably three holes of diameter d1. In the second array, at locus of a circle of diameter $pcd_2$, there are preferably eight holes of diameter d2. In the third and final, peripheral array, at locus of a circle of diameter $pcd_3$, there are preferably sixteen holes of diameter d3. (The "dimensions" $d_n$ and $pcd_n$ are actual dimensions divided by the pipe internal diameter D to obtain a "dimensionless" number.) In sum, the porosity of the profile plate preferably ranges from about 40 to about 60%. The holes in each circular array are equally spaced apart around the center of the plate. The upstream inlets of the holes are preferably beveled or contoured to reduce permanent pressure loss. However, all downstream edges of the holes are preferably square and sharp to minimize adverse reaction with the flow profile.

In the central array centered on the loci of the circle of diameter $pcd_1$, it is preferred that the porosity (P1) should range from about 3.0 to about 5.0%, most preferably 3.8%. The "size" of the holes expressed in dimensionless terms (i.e., as a fraction of D), d1, is based on the following equation:

$$d1=\left\{\left[\frac{P1}{(n1*100)}\right]^{0.5}\right\}$$

where n1 is the number of holes in the central array, range from two to five, but preferably three holes.

The porosity of the second array (P2) centered on the loci of the circle of diameter $pcd_2$ should preferably range from about 19.0 to about 21.0%, most preferably about 20%. The hole size for the second array d2 is based on the following equation:

$$d2=\left\{\left[\frac{P2}{(n2*100)}\right]^{0.5}\right\}$$

where n2 is the number of holes in the second array, range from five to eleven, but preferably eight holes.

Preferably, the pitch circle diameter of the first array expressed in dimensionless terms is given as:

$$pcd_1=0.1125$$

Further, the pitch circle diameter for the second circular array ($pcd_2$) expressed in dimensionless terms may be determined by the following equation:

$$pcd2=max\{[0.4990-0.0065*(P3-P2)]0.4500\}$$

The porosity for the third array is selected as the residual of the total plate porosity (Pt) minus the porosities for the central (P1) and second (P2) arrays. Thus, the porosity for the third array is found from the equation:

$$P3=Pt-(P1+P2)$$

Further, the hole size for the third array, d3, expressed in dimensionless terms, may be found from the equation:

$$d3=\left\{\left[\frac{P3}{(n3*100)}\right]^{0.5}\right\}$$

where n3 is the number of holes in the third array, ranges from about eleven to about twenty-one, but is preferably sixteen holes.

Finally, the pitch circle diameter for the third circular array ($pcd_3$), expressed in dimensionless terms, is based on the following equation:

$$pcd3=[0.8575-0.0041*(P3-P2)]$$

Dam height is defined as the minimum solid distance on the profile plates between the through bores or holes that form the circular arrays. Within the desired limits of plate porosity and limiting the permanent head loss, it is further preferable that the dam heights (dh1, dh2, dh3) expressed in dimensionless terms, between circular arrays should preferably be greater or equal to the following criteria:

$dh1 \geq 0.0100$ $dh2 \geq 0.0100$ $dh3 \geq 0.0200$

The dam heights expressed in dimensionless terms may be calculated using the following equations:

$$dh1 = \frac{[pcd2 - (d1 + d2 + pcd1)]}{2}$$

$$dh2 = \frac{[pcd3 - (d2 + d3 + pcd2)]}{2}$$

$$dh3 = \frac{[1.0000 - (d3 + pcd3)]}{2}$$

In order to convert the dimensionless terms used to actual dimensions, they should be multiplied by the internal pipe diameter (D).

Clearly, a person having ordinary skill in the art, having read the above disclosure and being familiar with the state of the art, will appreciate certain changes and modifications that are considered to be a part of the invention. Some of these modifications include modifying the number of holes in all three circular arrays as long as the equivalent porosity for a respective array approximates the values and/or equations stated above. Further, the number of circular arrays may be increased by replacing the second circular array with two tightly packed circular arrays which have a combined equivalent porosity approximating that of the second circular array, as described above. Likewise, the third circular array may be replaced with two tightly packed circular arrays having a combined porosity equivalent to that of the single third circular array, described above.

A profile plate, according to the invention and as shown in FIGS. 15A and B, having four arrays of holes or through bores, may be designed by modifying the equations used for the three-array design. Thus, for instance, the second array may be separated into two arrays having a porosity equivalent to the second array of a three-array plate. The pitch circle diameters of these two replacement arrays expressed in dimensionless terms are given by:

$pcd2_1 = 0.86 * pcd2$ $pcd2_2 = 1.22 * pcd2$

The through bore diameters, $d2_1$ and $d2_2$, expressed in dimensionless terms, are preferably about equal to 0.112.

Alternatively, as shown in FIGS. 16A and B, a four-array profile plate according to the invention may be produced by replacing the third array of a three-array plate with two arrays. In this instance, the sum of the porosities of the two replacement arrays is approximately equal to the porosity of the replaced third array. Also, the pitch circle diameters expressed in dimensionless terms, are as follows:

$pcd3_1 = 0.917 * pcd3$ $pcd3_2 = 1.047 * pcd3$

The diameters of the holes in the two replacement arrays, expressed in dimensionless terms, are approximately 0.112.

Similar principles apply in the development of the five-array profile plate according to the invention, as shown in FIGS. 17A and B. In this instance, both the third and second arrays are each replaced with two arrays.

FIG. 13 is a schematic cross section of a pipeline 50 of diameter D with a flow conditioner according to the invention installed upstream of a metering device 52. The direction of fluid flow is shown by arrow A. A disturbance, not shown, may be an elbow, tee, bend, valve, or other pipe restriction located upstream from the metering device 52 at a length L. Typically, L is selected to allow the fluid to stabilize after passing through the disturbance so as to minimize the effects of fluid flow irregularities on measurements taken at measuring device 52. According to the invention, the flow conditioner is interposed between the disturbance and metering device 52. Anti-swirl device 14 (shown as a bundle of tubes, but which may be of other configurations) is located a distance $L_0$ from the disturbance. In the event that the anti-swirl device comprises a bundle of tubes, then the length of these tubes is $L_1$. Immediately downstream from the anti-swirl device is settling chamber 30 having a length $L_2$. The settling chamber terminates at the profile device 32, shown as a perforated plate, with thickness $L_3$. Downstream of the profile device 32, at a distance $L_4$, is the metering device 52, shown as an orifice plate, although other measuring devices may be used.

As indicated above, under certain circumstances, fluid conditions in the pipeline may be such that the anti-swirl device 14 could be eliminated. Under these circumstances, the profile device according to the invention is located at a distance $L_5$ downstream from the disturbance and $L_4$ upstream from the metering device 52. Thus, the volume within the pipeline defined by the length $L_5$ serves as a settling chamber 30. The profile device according to the invention is of unique design and, unlike prior art devices, produces pseudo-fully developed flow that is swirl-free, and axisymmetric with a time average velocity profile and turbulent structure having values approximating those found in fully developed turbulent flow, and that are independent of axial coordinate.

Figure 14A:
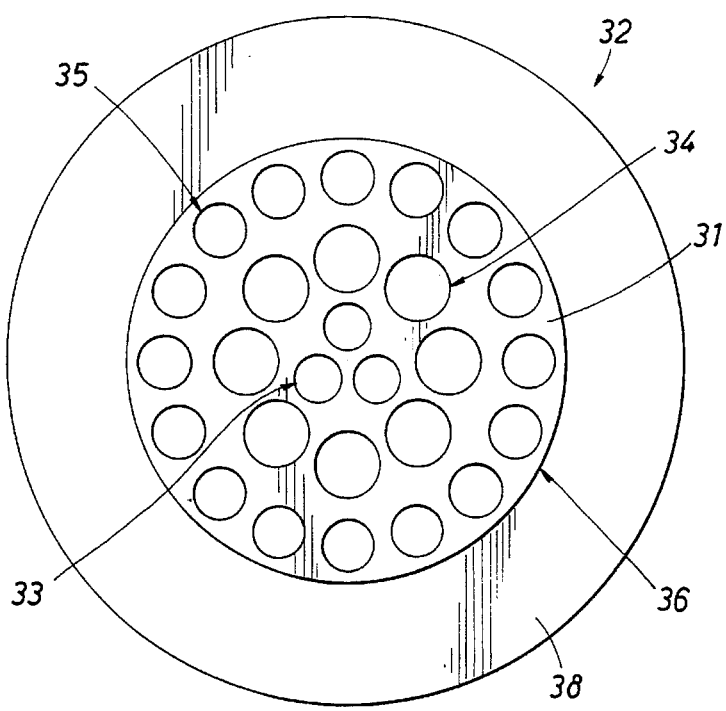
FIGS. 14A and B show an embodiment of a profile plate according to the invention with three arrays of holes or perforations.
Figure 14B:
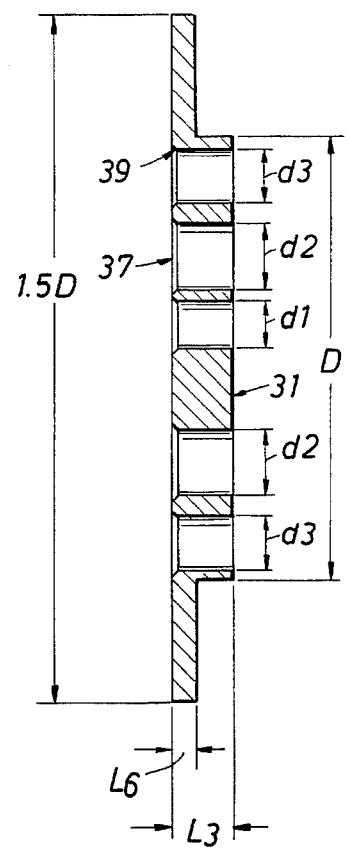

Embodiments of the preferred profile plates according to the invention are shown in FIGS. 14A and B, 15A and B, 16A and B, and 17A and B. These Figures show the location and size of holes or perforations on the profile plates for designs ranging from those having three arrays of holes (FIGS. 14A and B) to those having five arrays of holes (FIGS. 16A and B). Further, on the upstream side of the profile plate, the holes are chamferred to reduce permanent head loss, as shown. On the downstream side, however, the edges of the holes are preferably perpendicular to the plate, as shown.

FIG. 14A shows the downstream face 31 of an embodiment of a profile plate 32 according to the invention, having a disk-like body 36 of diameter D, with three arrays 33, 34, and 35 of through bores. The array 33 shown has 3 through bores, array 34 has 8, and 35 has 16. The through bores in each array are sized as shown and may be derived from calculations shown above. From FIG. 14B, upstream face 37 that faces the incoming fluid may have chamfered edges 39 on each of the through bore inlets. Typical chamfers are at 45°. However, the outlet ends of the through bores on downstream 31 have sharp edges. The profile plate body 36 is surrounded by a flange 38 of diameter about 1.5 D and thickness $L_6$ to allow for fitting the plate 32 between two pipe flanges.

FIGS. 15A and B show an embodiment of a profile plate 32 with four arrays 41, 42, 43, and 44 of through bores. Array 41 has 3 bores of diameter d1, array 42 has 8 bores of diameter d2, array 43 has 8 bores of diameter $d2_2(=d2_1)$, and array 44 has 16 bores of diameter d3. The calculation of these bore sizes is shown above.

FIGS. 16A and B show an embodiment of a profile plate with four arrays: 45, 46, 47, and 48. In this instance, the third array (array 35) of FIG. 14 has been replaced with two arrays. Thus, array 45 has 3 through bores, 46 has 8 through bores, 47 has 16 through bores, and 48 has 16 through bores. The diameters of these through bores may each be calculated, as explained above.

FIGS. 17A and B show an embodiment of a five array profile plate 32. The first array 54 has 3 through bores of diameter d1, the next array 56 has 8 through bores of diameter $d2_2$, as does array 57. The two outer arrays, 58 and 59, each have 16 through bores of diameter $d3_1$ and $d3_2$, respectively. As shown, $d3_1=d3_2$.

The following comparative examples and referenced figures are illustrative of the invention and do not in any way limit the scope of the invention as described above and claimed below.

EXAMPLES

The flow conditioner according to the invention was tested by an outside research laboratory and compared with commercially available devices. During this test, a test loop, shown in FIG. 18, was used. Gas enters a stagnation bottle 100 and flows to a straight section of pipe 102 of internal diameter D with a length 12 D, as shown. The pipe then bends in an elbow 104 that has a length of 2.2 D as measured from the center of the pipeline to the center of a flange at the end of the elbow, as shown in FIG. 18. From the elbow 104, gas flows into a length of pipeline 106 (the test pipe length) of length L (which is converted to dimensionless terms by dividing by D) that extends from the elbow to an orifice plate 108. The flow conditioners to be tested were positioned within the pipe length 106 at various distances X from the measuring device 110. To obtain dimensionless terms, the distance X was divided by the internal diameter D of pipe 106.

For each of the measurements taken, the internal diameter of the pipeline D was 4,027 inches and the length of pipe 106 was 17 D (except for AGA tube bundle tests which also used 45 D and 100 D lengths). The flow disturbance was created by either a 90° elbow (such as 104) or a tee installed upstream from the test pipe length 106.

By way of explanation, the designation Cd deviation (%) refers to the percentage deviation of empirical coefficient of discharge or flow calibration factor measured from fully developed flow experienced by a flow meter due to the influence of the flow conditioner and piping disturbance. Desirably, this deviation should be as near to zero as possible. As explained before, a "minimal deviation" from empirical meter coefficient (Cd) is regarded as plus or minus 0.1%.

Further, the β factor is the ratio of the orifice plate bore diameter ($\phi_o$) to the internal diameter of the pipeline in which the fluid flows (i.e., $\phi_o/D$).

Figure 19:
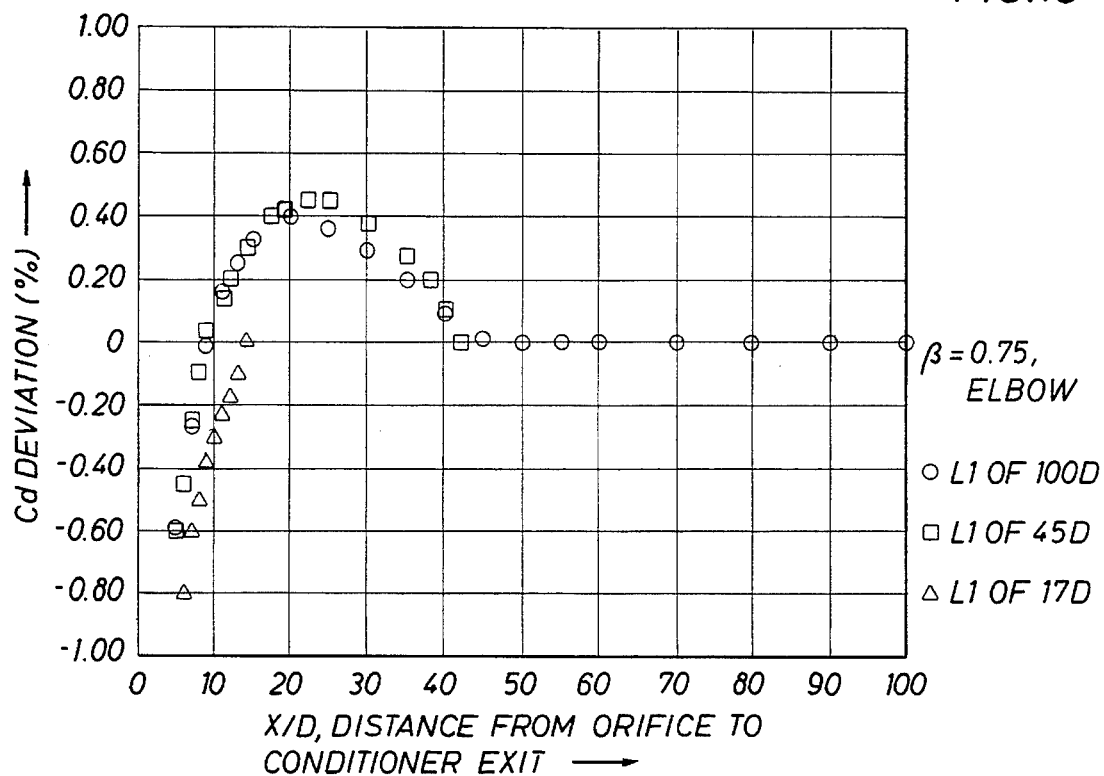
FIG. 19 summarizes the results obtained when an AGA tube bundle was utilized in 17 D, 45 D, and 100 D long test pipes with an orifice plate of $\beta=0.75$ in the apparatus of FIG. 18.

FIG. 19 summarizes the results obtained when an AGA tube bundle was utilized in the apparatus of FIG. 18 with test pipe lengths 106 of 17 D, 45 D, and 100 D. Within these pipe lengths, the AGA tube bundle was moved, relative to the orifice plate (of β=0.75) so that its distance X from the plate could be expressed as a fraction of the pipe diameter, i.e., as X/D. The Reynolds number characterizing the flow in the pipeline was 900,000. As can be seen from FIG. 19, the AGA tube bundle is unsuitable for conditioning flow and only has minimal meter coefficient deviation when:

$L_1$=17 D; and X/D=12–15

$L_1$32 45 D; and X/D=8–9

$L_1$=100 D; and X/D>about 45

Figure 20:
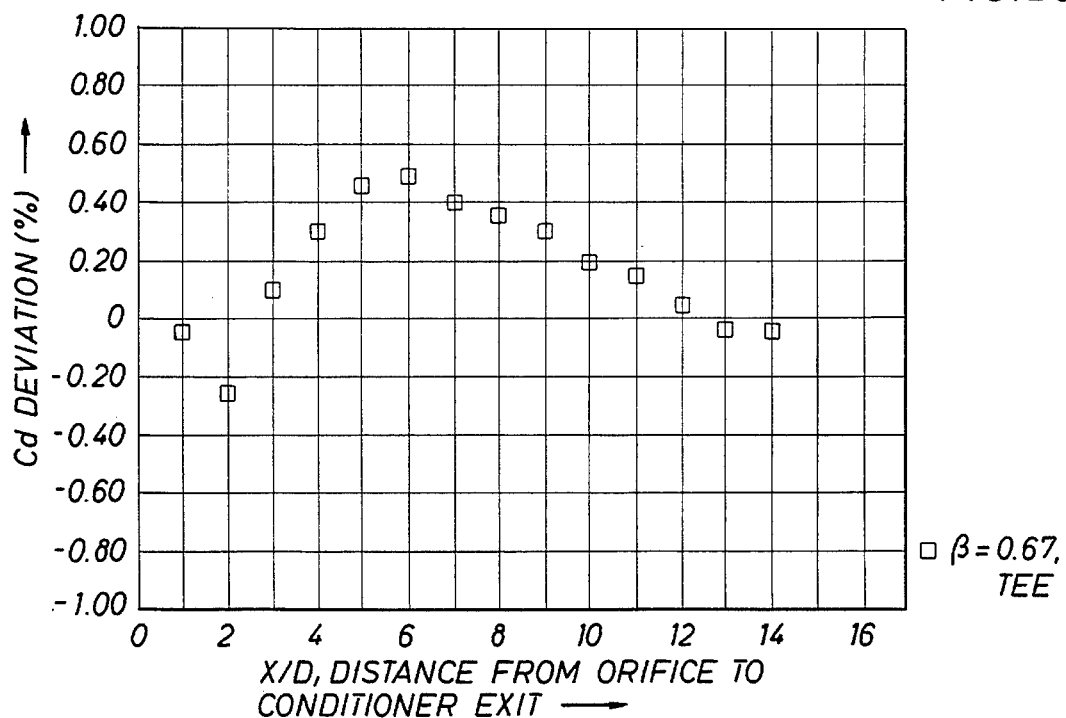
FIG. 20 summarizes empirical coefficient of discharge deviation data for Laws flow conditioner in a 17 D long test pipe used with an orifice plate of $\beta=0.67$ and a tee in place of the elbow of FIG. 18.

Similarly, FIG. 20 demonstrates that for a 17 D long test pipe, the Laws flow conditioner is only useful at distances of X/D that are greater than about 12. The β factor for the Laws conditioner tests was 0.67, the Reynolds number of the flowing fluid was 900,000, and the disturbance was a tee upstream from the meter tube.

Figure 21:
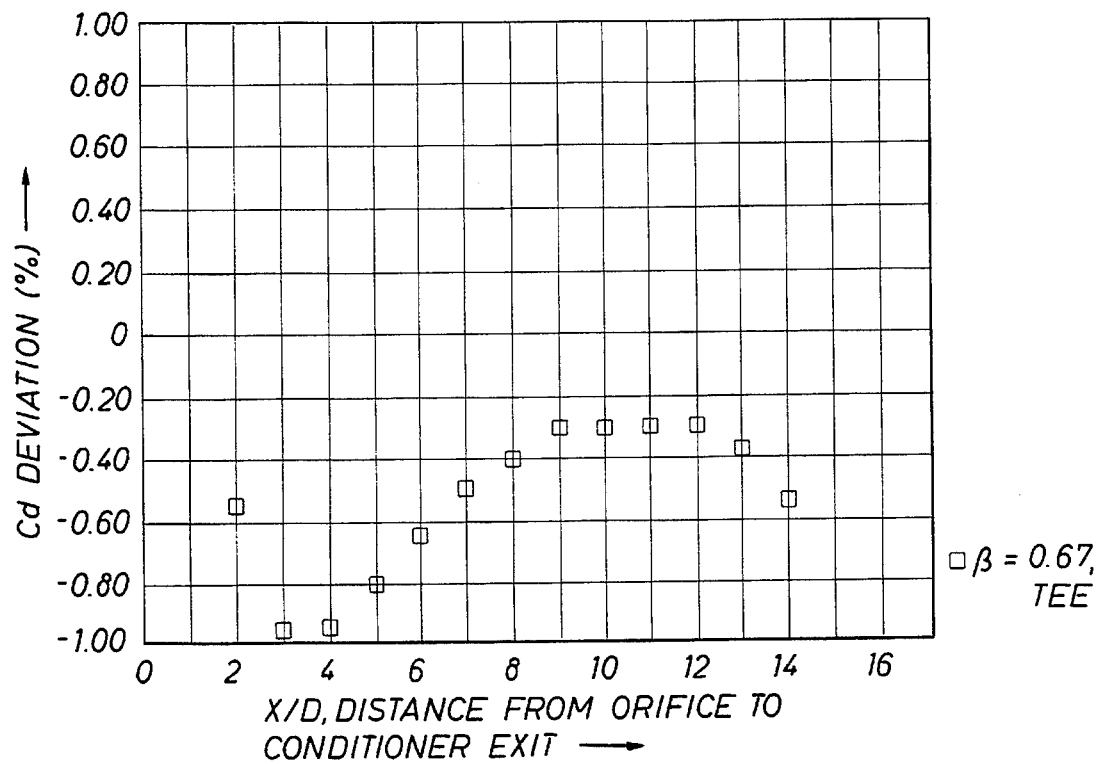
FIG. 21 summarizes data for an AGA tube bundle tested in a 17 D long test pipe with an orifice plate of $\beta=0.67$ and a tee instead of the elbow of FIG. 18.

FIG. 21 shows the results obtained when an AGA tube bundle is used in a 17 D long test pipe, downstream from a disturbance that is a tee. None of the data points show an acceptable or "minimal" deviation, since all are greater than 0.2%. The β factor for the orifice meter was 0.67 and the flow Reynolds number was 900,000.

Figure 22:
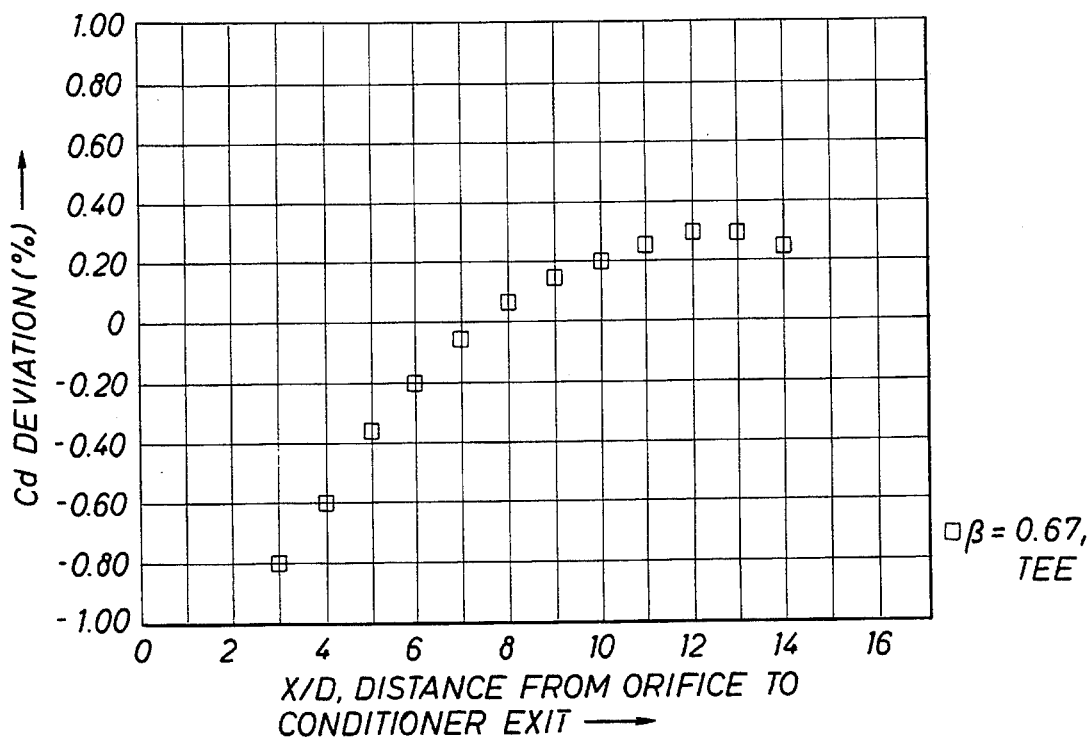
FIG. 22 summarizes empirical coefficient of discharge deviation obtained using a Mark V flow conditioner in a 17 D long test pipe with an orifice plate having a $\beta$ of 0.67 and a tee instead of the elbow of FIG. 18.

FIG. 22 is a summary of the results obtained using a Mark V flow conditioner in a 17 D long test pipe with an orifice plate having a β of 0.67 and flow Reynolds number of 900,000. The upstream disturbance was a tee in the pipeline. As can be seen from the results, minimal deviation from meter coefficient was only obtained when distance from the orifice meter (X/D) was in the range 7–8.

Figure 23:
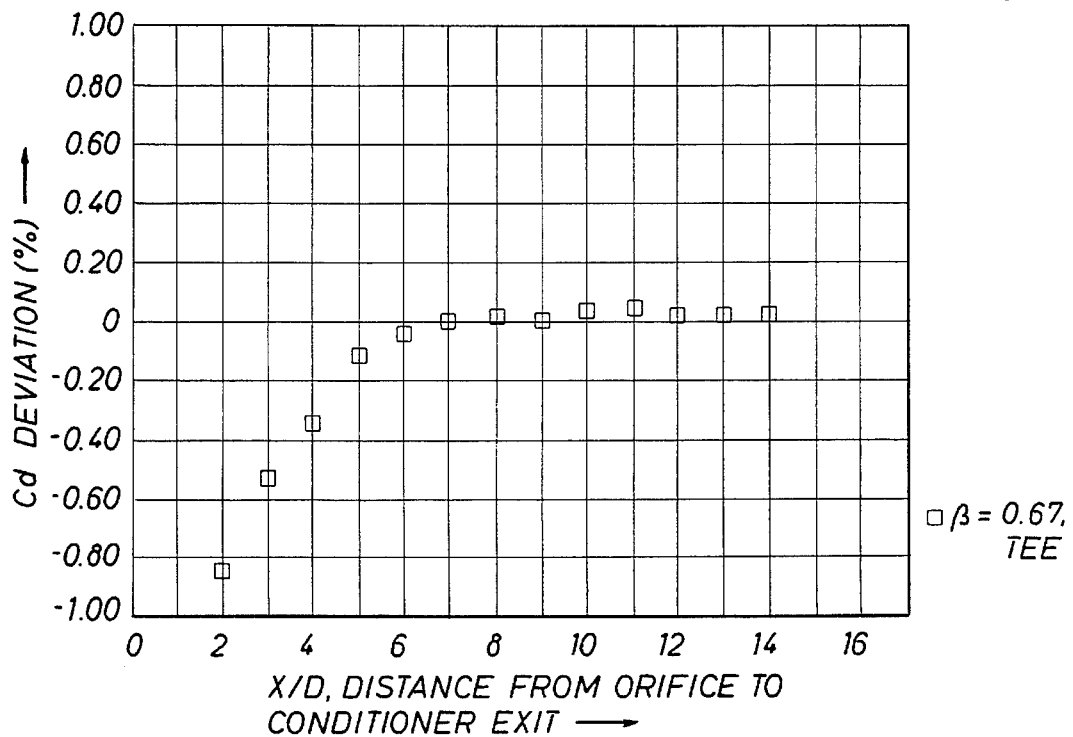
FIG. 23 summarizes empirical coefficient of discharge deviation obtained when an embodiment of the flow conditioner according to the invention was used under the same conditions as in FIGS. 20–22.

In sharp contrast, in FIG. 23, a flow conditioner according to the invention, under the same conditions (a 17 D long meter tube, orifice plate β=0.67, upstream disturbance a tee, and Reynolds number of 900,000) shows an acceptable minimal percent deviation from meter coefficient when X/D exceeds as little as about 5.5.

Figure 24:
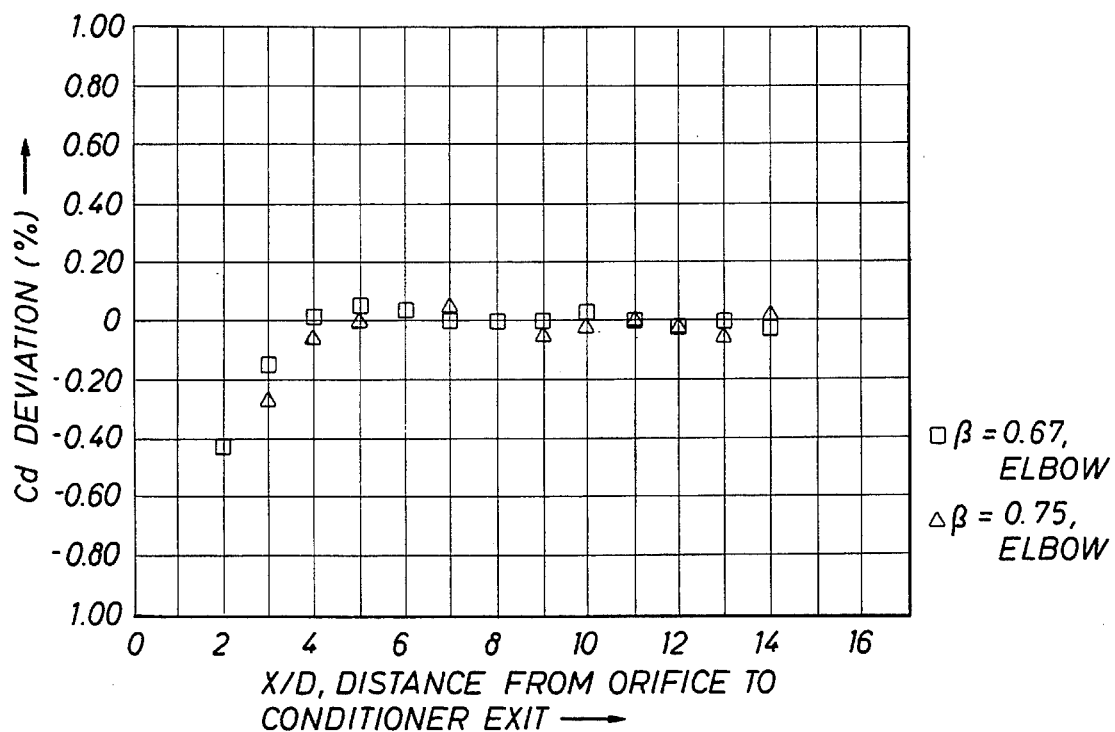
FIG. 24 summarizes empirical coefficient of discharge deviation obtained when an embodiment of the the flow conditioner according to the invention was used, under the same conditions as in FIG. 23, except that for points shown by a square, the $\beta$ factor was 0.75 and the flow disturbance was caused by an elbow, and for data points shown by a triangle, the $\beta$ was 0.67 and the disturbance was caused by an elbow.

FIG. 24 reflects the results obtained when a flow conditioner according to the invention was used under the same conditions as in FIG. 23, except that for data points shown by squares, the β was 0.67 and the disturbance was an elbow; and for data points shown by triangles, the β factor was 0.75 and the disturbance was an elbow. Based upon the results, it is clear that when X/D exceeds as little as about 3–4, the percentage meter coefficient deviation is acceptable and conforms to the minimum required (i.e., is less than 0.1%).

The above tests conclusively demonstrate the superiority of the invention flow conditioner that achieves minimum percent deviation from meter coefficient at distances of X/D far less than the AGA, Laws, or Mark V flow conditioners. Most importantly, the minimum percent deviation, when achieved, is stable so that reliable measurements can be taken as long as the minimum X/D is met.

Although the invention has been described with reference to its preferred embodiments, those of ordinary skill in the art may, upon reading this disclosure, appreciate changes and modifications which may be made and which do not depart from the scope and spirit of the invention as described above and claimed below.

What is claimed is:

1. A flow conditioner for use in a tubular pipe, of inside diameter D, to enable more accurate measurement of the rate of fluid flow in said pipe, the flow conditioner comprising:

(a) an anti-swirl device for positioning in a pipe upstream from a flow measuring device to reduce swirl to less than 2°;

(b) a profile device for positioning in a pipe upstream at a distance greater than about 0.5 D from the measuring device;

(c) a settling chamber intermediate said anti-swirl and profile devices, said settling chamber comprising an unconstricted elongate passage for fluid flow of sufficient length to decouple flow patterns generated by the profile plate of anti-swirl device effects when fluid flows in a pipeline from the anti-swirl device to the profile device.

2. The flow conditioner of claim 1, wherein the settling chamber has a length of about 3 D.

3. The flow conditioner of claim 1, wherein the anti-swirl device comprises a bundle of about nineteen tubes wherethrough fluid flows when the device is installed in a pipe.

4. The device of claim 1, wherein the profile device comprises a plate with at least three arrays of through bores, the bores of each array centered equidistantly on a locus of a circumference of a circle with a center coincident with a center of the plate, said plate center being free of through bores.

5. The flow conditioner of claim 4, wherein the anti-swirl device comprises a bundle of about nineteen tubes wherethrough fluid flows when the device is installed in a pipe; and the settling chamber has a length of about 3 D.

6. The flow conditioner of claim 5, wherein the measuring device is an orifice plate and the profile device is for positioning at least about 3 D from the orifice plate.

7. A flow conditioner in a tubular pipe, of inside diameter D, to enable more accurate measurement of the rate of fluid flow in said pipe, the flow conditioner comprising:

(a) an anti-swirl device, said device comprising a bundle of tubes of length about 0.2 *D to about 1 *D, and said tubes of diameter about 0.2 *D, the bundle sized and arranged to fit inside the pipe so that flowing fluid in the pipe flows through bores of the tubes; and (b) a profile plate comprising a disk-shaped body sized to fit within the pipe, the body comprising a plurality of through bores therethrough to enable fluid flowing in the pipe to pass through the profile plate;

wherein the profile plate is installed a distance of at least about D upstream of a measuring device.

8. The flow conditioner of claim 7, wherein the through bores of the profile plate are grouped in circular arrays and through bores of each array are equidistantly centered on a locus of a circumference of a circle, the circle centered on a through bore-free center of the disk-shaped body of the plate.

9. The flow conditioner of claim 8, wherein the number of circular arrays ranges from 3 to 5.

10. The profile plate of claim 9, wherein porosity of the plate is from about 40 to about 60%.

11. A unitary flow conditioner for installation in a pipe of internal diameter D to modify flow profiles of fluid flowing in said pipe, the flow conditioner comprising:

(a) an anti-swirl device for positioning downstream from a flow disturbance in the pipe and upstream from a flow measuring device to reduce swirl to less than about 2°;

(b) a profile device for positioning in the pipe upstream from the measuring device, at a distance of at least about D, and downstream from the anti-swirl device to create a pseudo-fully developed flow profile; and (c) elongate spacer rods extending between a downstream face of the anti-swirl device and an upstream face of the profile device thereby defining a settling chamber intermediate said anti-swirl and profile devices, the length of said spacer rods being sufficient to allow decoupling of the effects produced in flowing fluid by the anti-swirl device from the profile device, when said unitary flow conditioner is installed in a pipe to modify flow profiles of fluids.

12. The flow conditioner of claim 11, wherein the profile device comprises a disk-shaped plate body and the through bores are grouped in circular arrays, the through bores of each array are equidistantly centered on a locus of a circumference of a circle, the circle centered on a through bore-free center of the disk-shaped body of the plate.

13. The flow conditioner of claim 12, wherein the number of circular arrays ranges from 3 to 5.

14. The profile plate of claim 13, wherein porosity of the plate is from about 40 to about 60%.

15. The flow conditioner of claim 11, wherein the spacer rods have lengths of about 3 D.

* * * * *

UNITED STATES PATENT AND TRADEMARK OFFICE
CERTIFICATE OF CORRECTION

PATENT NO. : 5,495,872

DATED : March 5, 1996

INVENTOR(S) : JAMES E. GALLAGHER, RONALD E. BEATY, PAUL J. LANASA

It is certified that error appears in the above-identified patent and that said Letters Patent is hereby corrected as shown below:

Column 2, line 47 - change "(17,D)" to "(17*D)"

Column 2, line 51 - change "(7,D)" to "(7*D)"

Column 8, line 46 - insert "nominal" before "tube"

Column 9, line 32 - change "$L_1+L_2+L_3+L_4=0.5\ D\neq D+0.125\ D\neq D=6.6\ D$" to

"$L_1+L_2+L_3+L_4=0.5D+3D+0.125D+3D=6.6D$"

Column 9, line 61 - change "pcd," to $pcd_1$,"

Column 13, line 42 - change "4,027" to "4.027"

Column 14, line 8 - change "$L_1$ 32 45 D: and X/D=8-9 to

"$L_1=45D$; and X/D=8-9"

Signed and Sealed this

Fourth Day of June, 1996

Attest:

BRUCE LEHMAN

*Attesting Officer*     *Commissioner of Patents and Trademarks*

UNITED STATES PATENT AND TRADEMARK OFFICE
CERTIFICATE OF CORRECTION

PATENT NO. : 5,495,872

DATED : March 5, 1996

INVENTOR(S) : James E. Gallagher, Ronald E. Beaty, Paul J. LaNasa

It is certified that error appears in the above-identified patent and that said Letters Patent is hereby corrected as shown below:

Title page, item [75], please correct the spelling of the third inventor's name from "Lanasa" to "LaNasa".

Signed and Sealed this

Thirteenth Day of August, 1996

Attest:

BRUCE LEHMAN

Attesting Officer     Commissioner of Patents and Trademarks